(12) United States Patent
Fischer (10) Patent No.: US 6,691,865 B1
(45) Date of Patent: Feb. 17, 2004

(54) DECORATIVE TIRE COVER AND TRANSFER PATTERN AND METHOD FOR USE THEREWITH

(76) Inventor: Christopher E. Fischer, 3355 Talisman Ct., No. B, Boulder, CO (US) 80301

( * ) Notice: Subject to any disclaimer, the term of this patent is extended or adjusted under 35 U.S.C. 154(b) by 0 days.

(21) Appl. No.: 09/861,198

(22) Filed: May 18, 2001

Related U.S. Application Data
(60) Provisional application No. 60/205,050, filed on May 18, 2000.

(51) Int. Cl.[7] .............................................. B65D 65/02
(52) U.S. Cl. ............................. 206/304.1; 206/459.5; 428/914
(58) Field of Search ..................... 206/459.5, 304.1, 206/304.2, 304; 428/914, 195, 209; 423/210; 156/60

(56) References Cited

U.S. PATENT DOCUMENTS

| | | | | |
|---|---|---|---|---|
| 1,495,665 A | * | 5/1924 | Bigelow et al. | 206/304.1 |
| 1,508,419 A | * | 9/1924 | Sundback | 206/304.1 |
| 4,102,562 A | * | 7/1978 | Harper et al. | 359/518 |
| 4,123,309 A | * | 10/1978 | Perrington et al. | 156/234 |
| 4,401,494 A | * | 8/1983 | Pernicano et al. | 156/155 |
| 4,766,032 A | * | 8/1988 | Pernicano | 428/325 |
| 4,853,283 A | * | 8/1989 | Skolnick | 428/335 |
| 4,913,504 A | * | 4/1990 | Gallagher | 359/1 |
| 5,486,397 A | * | 1/1996 | Gordon et al. | 428/76 |
| 5,503,906 A | * | 4/1996 | Olsen | 428/195 |
| 5,525,177 A | * | 6/1996 | Ross | 156/240 |
| 5,869,168 A | * | 2/1999 | Mahn, Jr. | 428/195 |
| 6,010,764 A | * | 1/2000 | Abrams | 428/90 |

OTHER PUBLICATIONS

*3M Scotchlite™ Reflective Material 8730 Silver Transfer Film*, technical data sheet, provided by 3M of 3M Center, Building 225–4N–14, St. Paul, MN 55144–1000, Jan. 1999.

*3M Scotchlite™ Reflective Material 8710 Silver Transfer Film*, technical data sheet, provided by 3M of 3M Center, Building 225–4N–14, St. Paul, MN 55144–1000.

*3M Scotchlite™ Silver Graphic Transfer Film System*, technical data sheet, provided by 3M of 3M Center, Building 225–4N–14, St. Paul, MN 55144–1000, Aug. 1998.

*3M Scotchlite™ Reflective Material Transfer Film*, product sample, provided by 3M of 3M Center, Building 225–4N–14, St. Paul, MN 55144–1000.

*Safe Reflections Inc., Aurora™/Eclipse™ Relfective Graphic Transfers—Nylon*, technical data sheet, provided by Safe Reflections Inc., 3220 N. Granada Ave., Suite 100, St. Paul, MN 55128.

*Maxi Press Large Format Manual Heat Transfer Press*, brochure, provided by Geo Knight & Co., Inc, of 54 Lincoln Street, Brocktor, MA 02507.

\* cited by examiner

*Primary Examiner*—Shian Luong
(74) *Attorney, Agent, or Firm*—Timothy J. Martin; Michael R. Henson; Rebecca A. Gegick (57) ABSTRACT

The present invention relates to an article of manufacture having a reflective design thereon, as well as a method for manufacture thereof. The article of manufacture, such as a tire cover, comprises a substrate having a display surface, at least one adhesive material disposed on the display surface, and a first pigmented material arranged in a first design pattern and adhered to the display surface by the adhesive material, where the first pigmented material includes a plurality of glass particles operative to reflect light received from a light source. A second pigmented material, such as a reflective or non-reflective material of a different color, may be adhered to the display surface in a second design pattern. The present invention also provides a transfer pattern, and method for forming the same, that is for use in transferring a reflective design to a display surface.

13 Claims, 6 Drawing Sheets

DECORATIVE TIRE COVER AND TRANSFER PATTERN AND METHOD FOR USE THEREWITH

CROSS-REFERENCE TO RELATED APPLICATIONS

This application claims the benefit of U.S. Provisional Application No. 60/205,050, filed May 18, 2000.

FIELD OF THE INVENTION

The present invention generally relates to decorative patterns applied to surfaces. More particularly, the present invention relates to transfer patterns for use in transferring a design to the surface of an article of manufacture. Specifically, the present invention relates to a transfer pattern for use in transferring a design having a reflective material as a component thereof, and a decorative tire cover having a design transferred by the transfer pattern of the present invention.

BACKGROUND OF THE INVENTION

The use of tire covers on spare automobile tires has become an increasing phenomena. This use has become especially expanded in light of a growth in the market of sport utility vehicles, which commonly have a spare tire attached to an external fixture on the back of the automobile. Automobile manufacturers and dealers often find it desirable to place a name or logo on such tire covers, so that it is visible to other consumers, and accordingly provides additional marketing value. Additionally, it may be desirable for other businesses to provide such logos on company cars, thereby to provide further advertising possibilities. Moreover, automobile owners and drivers often desire to display such logos or writing, as well as personalized or customized designs, wording or images signifying pride in the ownership of their vehicle. Further, such logos or writing on a rear spare tire cover may provide added visibility for a following driver in adverse weather or night-time conditions, thus improving the safety of a vehicle having such tire cover logos.

Accordingly, it would be desirable to provide a tire cover having a design thereon, particularly one that is highly visible and distinctive, such as by the use of reflective or metallic appearing materials. However, in the past, such reflective materials have not been suitable for use with tire covers, which are commonly formed of flexible vinyl or similar material. In particular, such reflective or metallic appearing materials have not been suitably flexible or weather or abrasion resistant, such that they quickly peel and crack and thereby reduce the reflectivity or visibility of the design, as well as the aesthetic appearance thereof.

Additionally, prior attempts to provide highly visible designs on automobile tire covers have involved attaching a reflective strip of sign grade vinyl to the surface of the tire cover. However, these attempts have resulted in designs which can be easily removed from the surface by abrasion or failure in adhesion, and which are less appealing in visual aesthetic as well.

Accordingly, it would be desirable to provide a tire cover having a design imprinted thereon which incorporates a reflective material. It would be further desirable to provide such a design that is flexible, durable and/or weather resistant and that retains its reflectivity well after periods of use. Additionally, it would be desirable to provide a transfer pattern and method for simply and efficiently applying such a design to a surface such as a tire cover. The present invention is directed to meeting these needs.

SUMMARY OF THE INVENTION

It is an object of the present invention to provide a new and useful tire cover having a highly visible design imprinted thereon.

It is another object of the present invention to provide a tire cover having a design which incorporates a reflective material as a component thereof.

It is a further object to provide a transfer pattern for directly transferring to a surface a design having a reflective material as a component thereof.

It is yet another object to provide a method for forming a transfer pattern for use in creating a design having reflective qualities.

According to the present invention, then, an article of manufacture is provided having a reflective design thereon. The article of manufacture comprises a substrate having a display surface adapted to display the design, at least one adhesive material disposed on the display surface in a primary design pattern that has at least a first design portion and a second design portion, a first pigmented material arranged in a first design pattern that is congruent with the first design portion and that is adhered to the display surface by an adhesive material, and a second pigmented material arranged in a second design pattern that is congruent with the second design portion and that is adhered to the display surface by an adhesive material. The first pigmented material includes a plurality of glass particles that are operative to reflect light received from a light source. The second pigmented material may or may not include such glass particles.

The first pigmented material and second pigmented material may be colored different colors. Additionally, the first pigmented material and second pigmented material may respectively be adhered to the display surface by different adhesive materials. The first design portion may be contiguous with at least some of second design portion, or may not be contiguous with the second design portion.

The present invention additionally provides a tire cover adapted to extend over a tire that includes a tread surface, an annular sidewall surface and a wheel area. The tire cover comprises a cylindrical panel sized to extend circumferentially around the tire in confronting relation to the tread surface, a face panel joined to the cylindrical panel and sized to extend alongside the sidewall surface and across the wheel area, where the face panel has a display surface adapted to display the design. At least one adhesive material is disposed on the display surface, and a first pigmented material is arranged in a first design pattern and adhered to the display surface by an adhesive material. The first pigmented material includes a plurality of glass particles operative to reflect light received from a light source. The tire cover may include a second pigmented material arranged in a second design pattern and adhered to the display surface by an adhesive material.

The present invention further provides a method of manufacturing a tire cover adapted to extend over a tire, which comprises forming a material in the shape of a tire cover, and contacting the display surface with a transfer pattern thereby to transfer a design to a display surface of the tire cover.

The present invention also provides a transfer pattern for use in transferring a reflective design to a display surface, such as a vinyl tire cover surface. The transfer pattern comprises a substrate having a surface, a first pigmented material disposed on the surface, where the first pigmented material includes a plurality of glass particles operative to reflect light received from a light source, a second pigmented material overlaying at least a portion of the first pigmented material, and at least one adhesive material adhered to the first pigmented material and the second pigmented material in a primary design pattern that has at least a first design portion and a second design portion, wherein an adhesive material is adhered to the first pigmented material in a first design pattern that is congruent with the first design portion, and wherein an adhesive material is adhered to the second pigmented material in a second design pattern that is congruent with the second design portion. The present invention additionally provides a method of forming such a transfer pattern.

These and other objects of the present invention will become more readily appreciated and understood from a consideration of the following detailed description of the exemplary embodiment of the present invention when taken together with the accompanying drawings, in which:

DETAILED DESCRIPTION OF THE INVENTION

The present invention relates to articles of manufacture having a decorative pattern affixed thereto, wherein the decorative pattern incorporates a reflective material as a component thereof. Specifically, various embodiments of the present invention relate to tire covers having disposed on a surface thereof a design incorporating a reflective material. The tire cover designs of the present invention are preferably soft, lightweight, flexible, durable, and abrasion resistant. The present invention provides tire cover designs in which reflective material, such as a reflective film or other reflective composition, may be adhered directly to the surface of the tire cover by adhesive. In particular, the reflective designs of the present invention may be formed without the use of a backing strip interposed between the reflective material of the design and the surface of the tire cover. The present invention also relates to transfer patterns, methods for production thereof, and methods for transferring such designs to the surface of an article of manufacture.

Figures 1, 2:
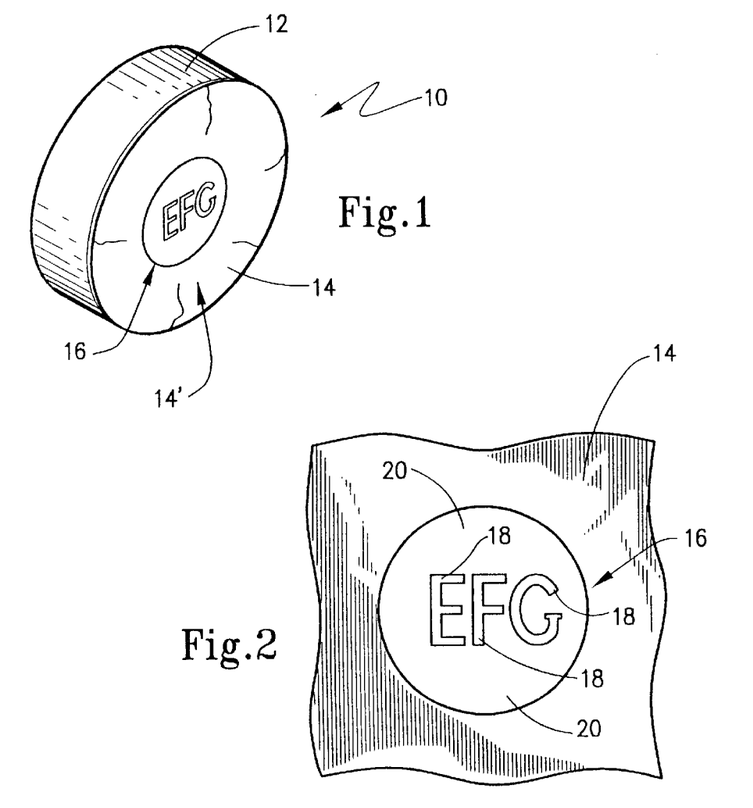
FIG. 1 is a perspective view of an embodiment of a tire cover according to the present invention.
FIG. 2 is a top plan view of a portion of the tire cover of FIG. 1 showing a design on the surface thereof produced using a first embodiment of a transfer pattern according to the present invention.

Turning to FIG. 1, a tire cover 10 according to the present invention is of a generally cylindrical cup-shape for fitting over an automobile tire that has a tread surface, an annular sidewall surface and a wheel area, as known in the art. Tire cover 10 has a cylindrical panel 12 sized to extend circumferentially around a tire in confronting relation to the tread surface thereof. A generally circular face panel 14 is joined to cylindrical panel 16 and is sized to extend alongside the tire sidewall surface and across the tire wheel area. The face panel 14 has a display surface 14' adapted to display a design 16 according to the present invention. As known in the art, tire cover 10 may be formed of a suitable material, such as vinyl and the like, which preferably is flexible and resists weather, wear and abrasion commonly encountered by automobile tire covers. It should be appreciated that other materials may be used as known in the art, such as materials for forming generally non-flexible covers that are molded or otherwise formed to fit over an automobile tire. Tire cover 10 includes a design 16 according to the present invention disposed thereon, said design preferably being formed of materials that are flexible and weather resistant, thereby to be suitable for use on tire cover 10.

As shown in FIG. 2, a first embodiment of a design 16 preferably includes reflective portions 18 and colored portions 20 adjacent reflective portions 18. It should be appreciated that, as used herein, the term "reflective" relates to materials that incorporate a plurality of glass particles that operative to reflect light received from a light source, as discussed more thoroughly below. It should be appreciated, then, that materials that are "non-reflective" as used herein include materials that do not incorporate such glass particles, or which incorporate such glass particles in minimal quantities or concentrations.

It should further be appreciated that, while shown here as the letters "EFG" enclosed in a circle, design 16 may additionally be presented as various text and/or pictorial artistic configurations, such as those incorporating names and logos of various automobile manufacturers or dealers, corporate logos, advertisements and the like. Further, while colored portion 20 is shown here surrounding reflective portion 18, various other configurations are contemplated. For example, reflective portion 18 as shown in design 16 may be substituted with a colored portion 20 and vice versa such that the reflective and non-reflective portions in design 16 are switched from that shown. The ordinarily skilled artisan will appreciate that numerous artistic configurations of colored and reflective portions may be devised, and are within the scope of the present invention.

Preferably, reflective portion 18 is of a silvery or metallic character, such that reflective portion 18 will appear as a brilliant silver-white when viewed by a driver using vehicle headlights, although it should be appreciated that reflective portion 18 may alternatively be a variety of reflective colors. Colored portion 20 may be provided in various colors and textures as desired, such as by the use of standard silk-screening inks and processes, as known in the art. Display surface 14' of tire cover 10 may be configured in a desired color or texture, such as a black vinyl fabric, or other color and/or fabric, as known in the art.

Figure 3:
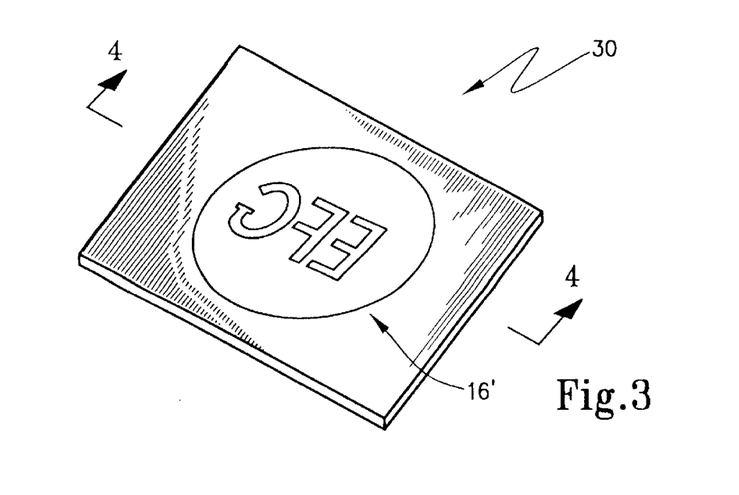
FIG. 3 is a perspective view of a first embodiment of a transfer pattern according to the present invention for use in transferring a design such as that shown in FIG. 2.
Figures 4, 5:
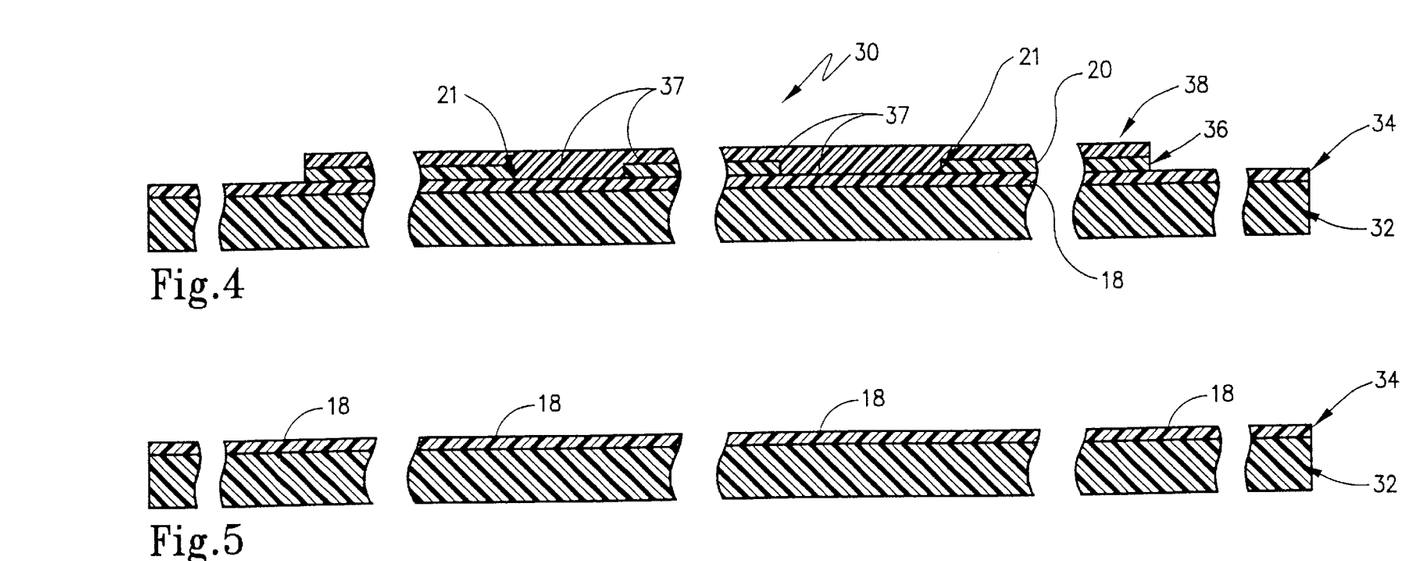
FIG. 4 is a cross-sectional side view of a portion of the transfer pattern of FIG. 3.
FIG. 5 is a cross-sectional side view showing portions of a substrate layer and a first, reflective, pigmented material layer for use in forming the transfer pattern of FIG. 3.

As shown in FIG. 3, designs according to the present invention may be provided by use of transfer pattern 30 having transfer design 16' thereon, which appears as a mirror image of the design 16 that is to be transferred to a tire cover. With reference to FIG. 4, transfer pattern 30 includes a substrate layer 32, a first pigmented layer 34, which is formed of a reflective material as described herein, a second pigmented material layer 36, and an adhesive layer 38. First pigmented material layer 34 is formed of reflective material 18, and second pigmented material layer 36 is preferably formed of non-reflective material 20, although second pigmented material layer 36 may alternatively also be formed of a material having some degree of reflectance, as known in the art. For example, second pigmented material layer 36 may be formed of a material similar or identical to reflective material 18, which may be of the same or different color.

It should be appreciated that non-reflective material 20 in second pigmented material layer 36 preferably overlays first pigmented material layer 34 incompletely, in a desired design pattern or configuration. Such incomplete coverage may create a first design pattern of first pigmented material layer 34 and a second design pattern of second pigmented material layer 36. Additionally, it should be appreciated that the first and second pigmented materials may be arranged such that the first and second design patterns may contiguous, partially contiguous, or discontiguous with each other.

Substrate layer 32 may be a non-stick plastic or paper material, such as polyester, wax paper or white paper. Substrate layer 32 and first pigmented material layer 34 may be obtained together as a single product from 3M Corporation, located in St. Paul, Minn., under the trade name Scotchlite™ Silver Transfer Film, such as the Scotchlite™ product numbers 5710, 5721, 8710, and 8730 available from 3M. The Scotchlite™ product is also believed to be available in various other colors in addition to silver, and it should be understood that the present invention contemplates the use of such additional colors in forming transfer patterns as discussed herein. The Scotchlite™ Silver Transfer Film product includes a wide angle, exposed retroreflective lens sheeting that has a daytime color of silver and a reflected color of white, and has been shown to maintain a minimum coefficient of retroreflection ($R_A$) of 100 after exposure to abrasion, flexing, cold fold, temperature cycle, wash, dry clean and wet reflectivity tests. In particular, the Scotchlite™ products are believed to include a layer of glass particles, and tiny glass beads in particular, that function as wide-angle, retroreflective lenses, which are protected by a white paper or polyester liner, to which a binder as known in the art may be applied to maintain contact between the bead layer and liner. Alternatively, reflective material 18 may be provided as the reflective ink material manufactured by 3M that is used in the 3M Scotchlite™ products. It should be appreciated that other similar inks or products may be utilized in the present invention.

Second pigmented material 20 may be a non-reflective ink material of numerous colors as known in the art for screen printing, such as traditional inks, and acrylic based inks in particular, which are commonly used on vinyl and similar materials. Alternatively, second pigmented material 20 may include reflective properties similar to reflective material 18. Second pigmented material 20 is preferably one, however, to which reflective material 18 will not adhere when in contact therewith. However, as discussed below, a release agent, such as silicone, may be used to separate the first and second pigmented materials. Adhesive layer 38 may be formed of suitable adhesives manufactured by Bostik-Findley, located in Middleton, Mass., such as granular polyester hot melt adhesives identified as product numbers 7186 and 7183, or similar adhesives. Alternatively, adhesive layer 38 may comprise a 3M plastisol adhesive system for use with its Scotchlite™ product, which is identified under the tradename 3M 571K ink kit. This kit includes as the adhesive components 3M's 571P ink and 3M's 571N coupler. The adhesive is formed by mixing the components in the ratio of 100 parts 571P ink and 4 parts 571N coupler. Other types of adhesives may be used with the present invention, such as acrylic silkscreen inks, hot melt adhesives, polyurethane adhesives, solvent adhesives and the like. It should be appreciated that a protective backing may be provided to protect adhesive layer 38 during transportation, and may be a suitable plastic film, non-stick sheet, paper or the like, as known in the art for protecting adhesive backings.

Figure 6:
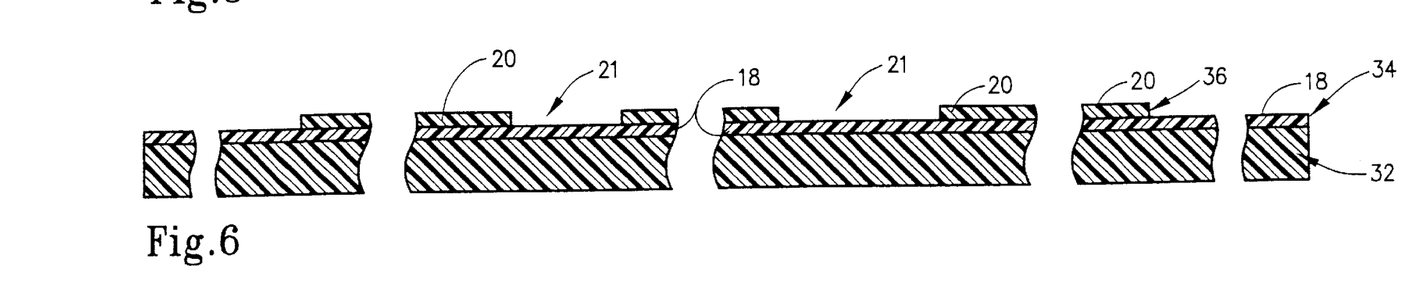
FIG. 6 is a cross-sectional side view showing the layer portions of FIG. 5 with a second pigmented material layer added thereto.

The production of transfer pattern 30 is shown with respect to FIGS. 4–6. In particular, as shown in FIG. 5, reflective material 18 is first applied to substrate layer 32 to form first pigmented material layer 34 disposed on substrate layer 32. It should be appreciated that when the Scotchlite™ product is utilized, that product provides reflective first pigmented material layer 34 already disposed on substrate layer 32.

As shown in FIG. 6, non-reflective material 20 is next applied on top of reflective first pigmented material layer 34 to form second pigmented material layer 36. It should be appreciated that non-reflective material 20 is applied to reflective layer 34 in a negative image of the desired image for reflective material 18, such as is apparent with respect to FIG. 2. That is, again with reference to FIG. 6, voids 21 are left uncovered by non-reflective material 20 in a pattern corresponding with the desired pattern through which reflective material 18 is to be visible in design 16, such as the "EFG" pattern in FIG. 2. As shown again with reference to FIG. 4, adhesive material 37 is next applied to second pigmented material layer 36 and to the exposed portions of reflective first pigmented material layer 34 in voids 21 thereby to create an adhesive layer 38 covering only the design portions of transfer pattern 30. Appropriate gelling of the adhesive 37, such as by use of an oven as known in the art, may be necessary after application of adhesive 37. If transfer pattern 30 is to be transported or stored prior to being applied to a surface, an optional protective backing may be applied to adhesive layer 38, as known in the art.

Figure 7:
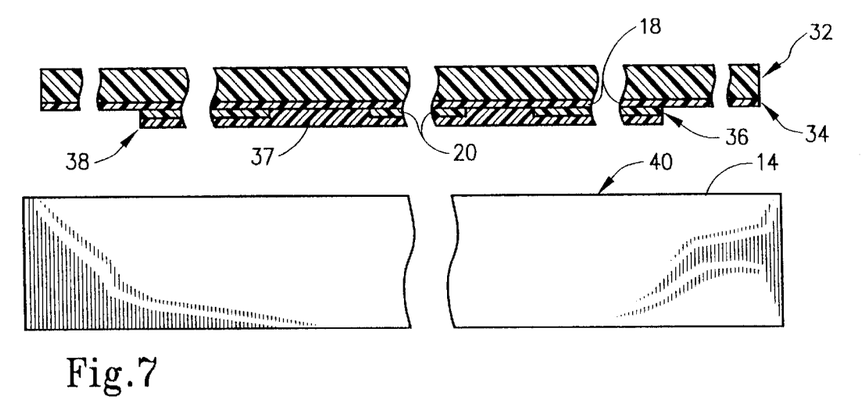
FIG. 7 is a cross-sectional side view of a portion of the transfer pattern of FIG. 3 in proximity to a tire cover surface region according to the present invention.
Figure 8:
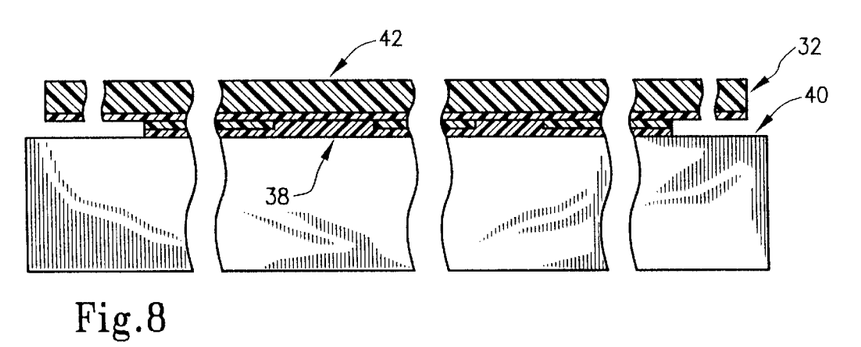
FIG. 8 is a cross-sectional side view of the transfer pattern portion and tire cover surface region according to FIG. 7, showing the transfer pattern bonded to the surface of the tire cover.
Figure 9:
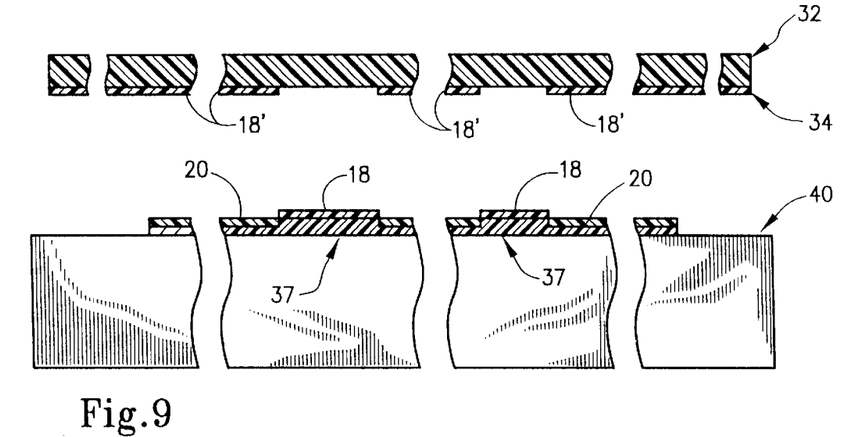
FIG. 9 is a cross-sectional side view of the transfer pattern portion and tire cover surface region according to FIG. 7, showing the substrate layer and portions of the reflective material layer removed from the remaining design that is bonded to the surface of the tire cover.

The application of a design by use of transfer pattern 30 is demonstrated with reference to FIGS. 7–9. First, tire surface region 14 is placed on a flat working surface to which uniform heat and pressure can be applied, thereby to present application surface 40 of tire surface region 14. Next, if present, the optional protective backing is removed, thereby to expose adhesive layer 38 having appropriately gelled adhesive 37, if necessary. As shown in FIG. 8, adhesive layer 38 of transfer pattern 30 is placed adjacent application surface 40, and heat and pressure are applied to transfer pattern 30, such as on outer surface 42 of substrate layer 32, at 250° to 270° F. and 60 to 80 psi for 15 to 25 seconds, and preferably at 260° F. for 20 seconds, such as by use of a Maxi-Press™ large format manual heat transfer press, manufactured by George Knight & Co., located in Brockton, Mass. Other temperature, pressure and time conditions may be utilized as appropriate. It should be appreciated that, in addition to heat press lamination, other lamination procedures may be utilized, such as roll to roll, heat fusing, microwave and high frequency welding. If necessary, tire surface region 14 may be pre-heated prior to applying transfer pattern 30 thereto, so as to prevent shrinkage of the tire cover material under the transfer.

After heat and pressure are applied to transfer pattern 30, transfer pattern 30 is preferably next allowed to cool under pressure for 8 to 10 seconds, and thereafter allowed to cool to room temperature without pressure. After transfer pattern 30 has cooled, substrate layer 32 and portions of reflective first pigmented material layer 34 are removed, as shown in FIG. 9, such as by manually peeling away substrate layer 32. It should be appreciated that those portions of reflective material 18 and non-reflective material 20 which are adjacent adhesive 37 in transfer pattern 30 will become adhered to working surface 40. Conversely, reflective material portions 18' which are not adjacent adhesive 37 in transfer pattern 30 will remain disposed on substrate layer 32 when that layer is peeled away. Accordingly, only the desired pattern of reflective material 18 and non-reflective material 20 becomes adhered to working surface 40 by the action of adhesive 37.

A tire cover 10 accordingly results that has design 16 bonded thereto, as shown in FIGS. 1 and 2. A tire cover 10 according to the present invention was washed and dried 30 times at home laundry conditions (130° F. with mild detergent). The sample wash results showed excellent wash and abrasions durability and acceptable adhesion of the design 16 onto tire cover 10. Additionally, the sample wash results showed that design 16 retained 95% of the initial reflective value and good visual aesthetics.

Figure 10:
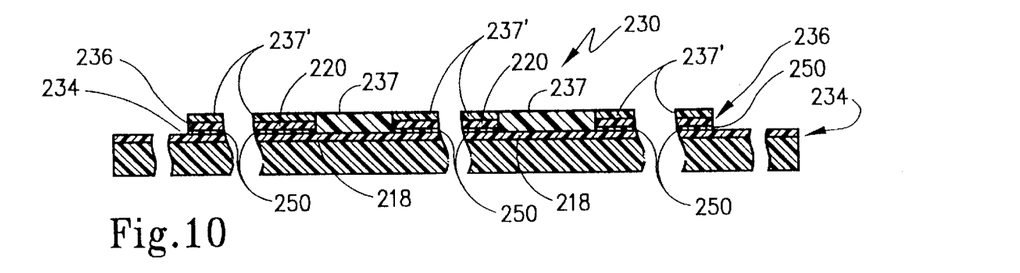
FIG. 10 is a cross-sectional side view of a portion of a second embodiment of a transfer pattern according to the present invention for use in transferring a design such as that shown in FIG. 2.

A second embodiment of a transfer pattern according to the present invention is described with reference to FIGS. 10–13. As shown in FIG. 10, transfer pattern 230 is similar to pattern 30 shown in FIG. 4, except that two types of adhesive, 237 and 237' respectively, are used. Additionally, a release layer 250 is provided between reflective first pigmented material layer 234 and second pigmented material layer 236, thereby to reduce or prevent adherence of reflective first pigmented material layer 234 to second pigmented material layer 236. Release layer 250 preferably comprises a silicone material, such as various silicones commonly used as release agents in the art.

With respect to adhesives 237 and 237', it should be noted that adhesive 237 is disposed directly over reflective material 218 in reflective layer 234. Adhesive 237 is preferably a hot melt adhesive, such as Thermogrip™ 1165 manufactured by Bostik, located in Middleton, Mass. Adhesive 237', on the other hand, is disposed directly over non-reflective material 220 in second pigmented material layer 236. Adhesive 237' is also preferably a hot melt adhesive, such as a urethane material as known in the art.

Figure 11:
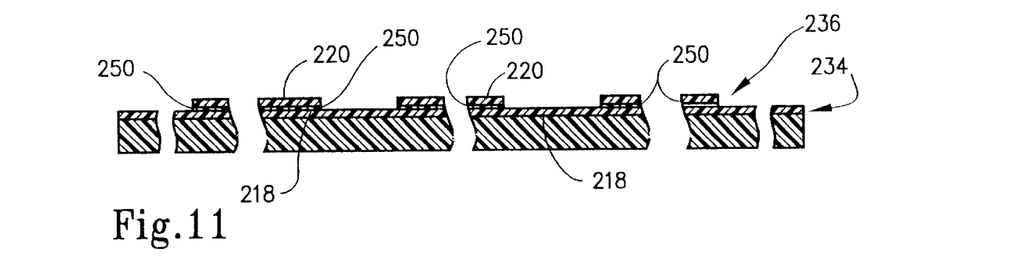
FIG. 11 is a cross-sectional side view showing various layers of the transfer pattern of FIG. 10, absent the adhesive material.

Transfer pattern 230 may be formed by disposing release layer 250 directly onto reflective layer 234 in a desired design pattern, and thereafter disposing non-reflective material 220 directly over release layer 250 in the desired pattern to form second pigmented material layer 236, as shown in FIG. 11. Adhesives 237 and 237', respectively, may then be applied over reflective material 218 and non-reflective material 220 to form transfer pattern 230 shown in FIG. 10.

Figure 12:
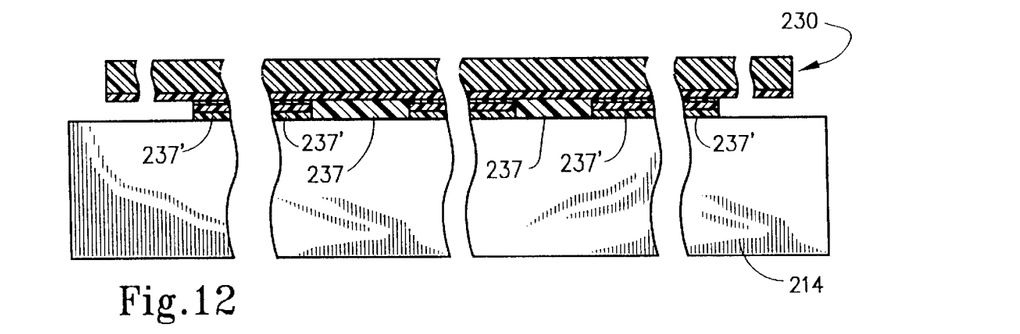
FIG. 12 is a cross-sectional side view of a portion of the transfer pattern of FIG. 10 bonded to a tire cover surface region.
Figure 13:
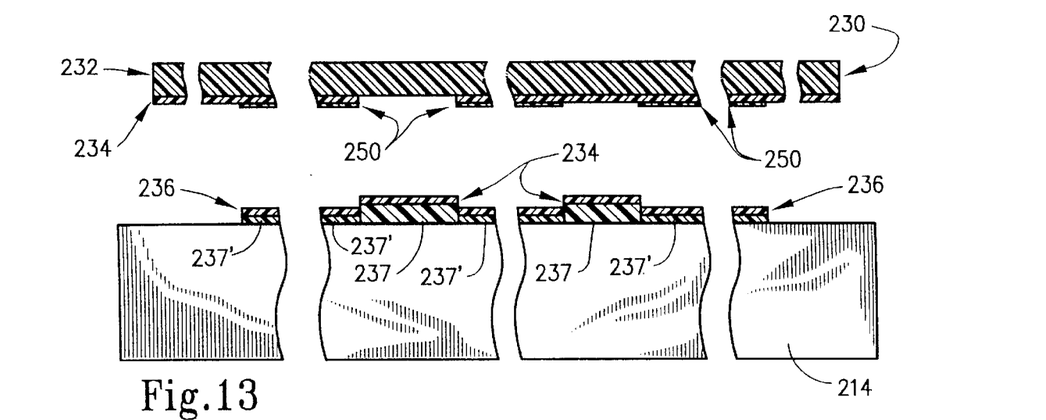
FIG. 13 is a cross-sectional side view of the transfer pattern portion and tire cover surface region according to FIG. 12, showing the substrate layer, portions of the reflective material layer, and release layer removed from the remaining design that is bonded to the surface of the tire cover.

Transfer pattern 230 may be adhered to a tire cover surface region 214 in the manner shown with respect to FIGS. 12 and 13. As shown with respect to FIG. 12, transfer pattern 230 is inverted and adhesives 237 and 237' are affixed to tire cover surface region 214 in the manner described with reference to transfer pattern 30 in FIGS. 7–9. Substrate layer 232, a portion of reflective layer 234, and release layer 250 are then pealed away, as shown in FIG. 13, leaving a design having a portion of reflective layer 234 adhered to adhesive 237 and having second pigmented material layer 236 adhered to adhesive 237'. It should be noted that because release layer 250 does not stick to second pigmented material layer 236, release layer 250 preferably peels away therefrom, thereby to leave second pigmented material layer 236 adhered to tire cover surface region 214. Release layer 250 reduces or prevents reflective layer 234 from sticking to second pigmented material layer 236, such that second pigmented material layer 236 becomes exposed in the respective design pattern on tire cover surface region 214.

Figure 14:
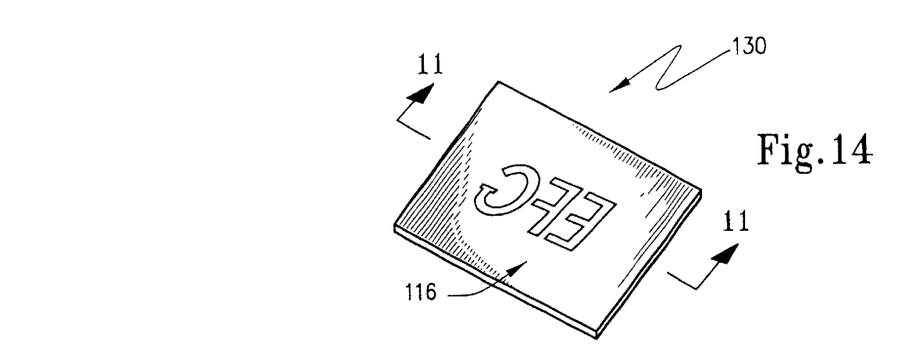
FIG. 14 is a perspective view of a third embodiment of a transfer pattern according to the present invention for use in transferring a design to a tire cover surface.
Figure 15:
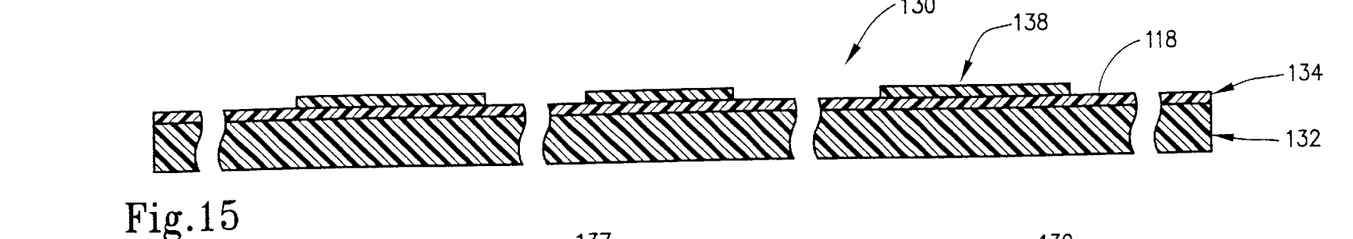
FIG. 15 is a cross-sectional side view of a portion of the transfer pattern of FIG. 14.
Figure 16:
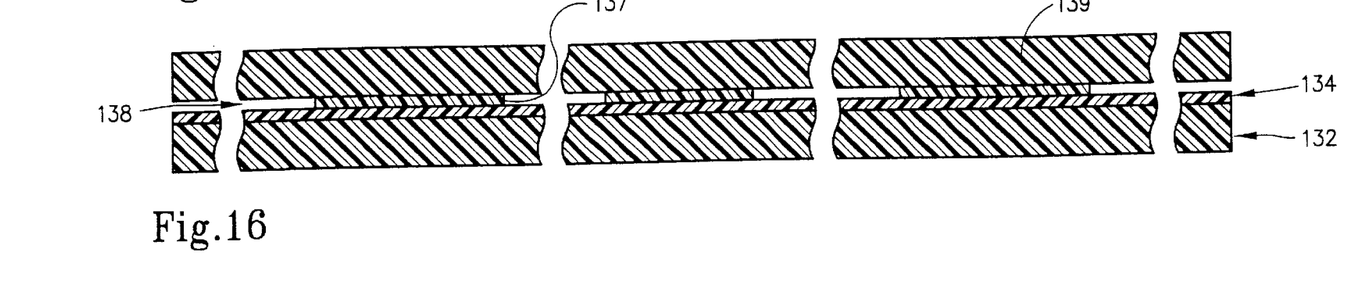
FIG. 16 is a cross-sectional side view of a portion of the transfer pattern of FIG. 14 showing a protective layer adjacent the adhesive.

A third embodiment of a transfer pattern according to the present invention is demonstrated with respect to FIGS. 14–19. As shown in FIG. 14, a transfer pattern 130 according to the third embodiment comprises a design 116 having only reflective characteristics. That is, design 116, again shown in the pattern "EFG", is formed of a single layer of reflective material, and does not include a second pigmented material layer as described above. The formation of a transfer pattern 130 is shown with respect to FIGS. 15–16. Here, reflective material 118 is disposed on substrate layer 132 to form reflective layer 134. Again, as described above, substrate layer 132 and reflective layer 134 may be provided together as the 3M Scotchlite™ product. Next, an adhesive layer 138 of adhesive 137 is formed on reflective layer 134, such as by screen printing adhesive 137 onto reflective layer 134. Here, adhesive layer 138 is provided in the desired pattern 116, such as the "EFG" pattern shown in FIG. 14. As demonstrated with respect to FIG. 16, an optional protective backing 139 may be applied to adhesive layer 138 so as to protect adhesive 137 during transportation, as known in the art.

Figure 17:
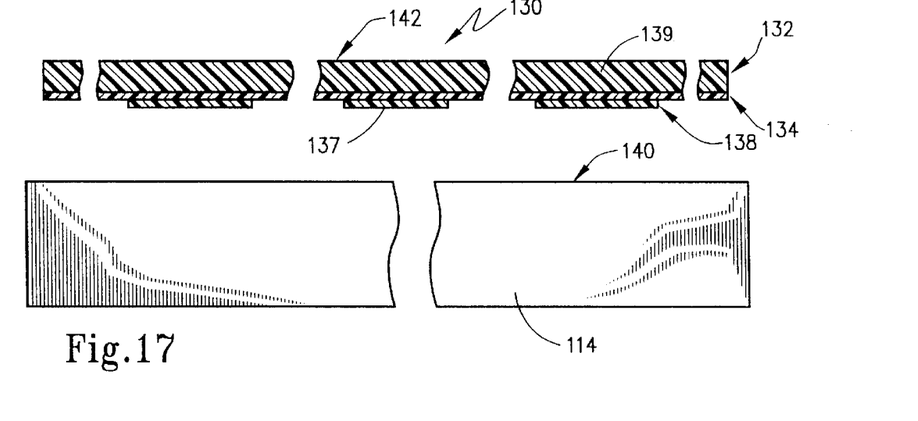
FIG. 17 is a cross-sectional side view of a portion of the transfer pattern of FIG. 14 in proximity to a tire cover surface region according to the present invention.
Figure 18:
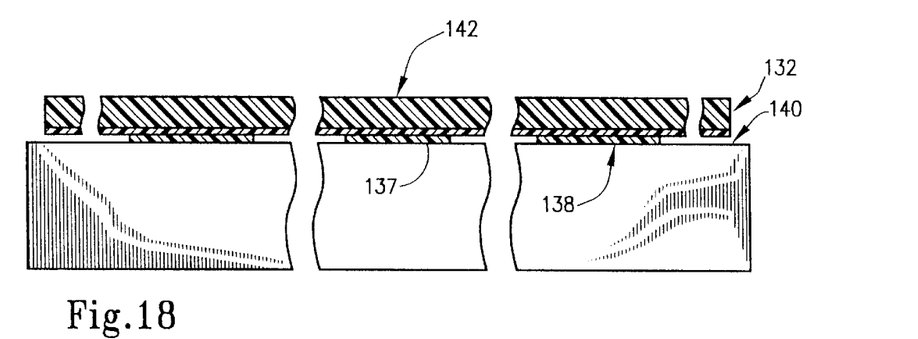
FIG. 18 is a cross-sectional side view of the transfer pattern portion and tire cover surface region according to FIG. 17, showing the transfer pattern bonded to the surface of the tire cover.
Figure 19:
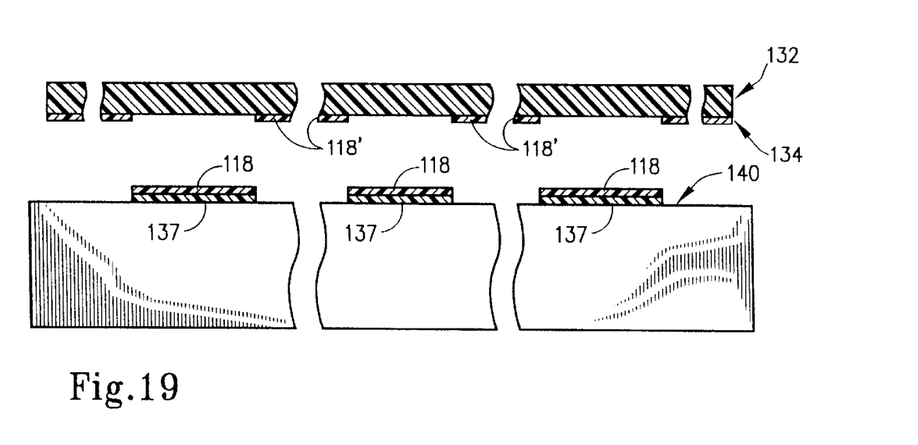
FIG. 19 is a cross-sectional side view of the transfer pattern portion and tire cover surface region according to FIG. 17, showing the substrate layer and portions of the reflective material layer removed from the remaining design that is bonded to the surface of the tire cover.

The application of a design to a tire cover by use of transfer pattern 130 is demonstrated with reference to FIGS. 17–19. First, as with the first embodiment above, tire surface region 114 is placed on a flat working surface to which uniform heat and pressure can be applied, thereby to present application surface 140 of tire surface region 114. Next, if present, the optional protective backing 139 is removed, thereby to expose adhesive layer 138 having appropriately gelled adhesive 137. As shown in FIG. 14, adhesive layer 138 of transfer pattern 130 is placed adjacent application surface 140, and heat and pressure are applied to transfer pattern 130, such as on outer surface 142 of substrate layer 132, as described above.

After heat and pressure are applied to transfer pattern 130, transfer pattern 130 is preferably next allowed to cool, as above, and thereafter substrate layer 132 and portions of reflective layer 134 are removed, as shown in FIG. 19, such as by manually peeling away substrate layer 132. It should again be appreciated that those portions of reflective material 118 onto which adhesive 137 are disposed in transfer pattern 130 will become adhered to working surface 140. Conversely, reflective material portions 118' which are not exposed to adhesive 137 in transfer pattern 130 will remain disposed on substrate layer 132 when that layer is peeled away. Accordingly, only the desired pattern of reflective material 118 becomes adhered to working surface 140 by the action of adhesive 137, leaving a pattern of reflective material 137 on tire cover 114 in the pattern in which adhesive 137 was applied to reflective layer 137 in forming transfer pattern 130.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A tire cover adapted to extend over a tire that includes a tread surface, an annular sidewall surface and a wheel area, comprising:
   (a) a cylindrical panel sized to extend circumferentially around the tire in confronting relation to said tread surface;
   (b) a face panel joined to said cylindrical panel and sized to extend alongside the sidewall surface and across the wheel area;
      (1) said face panel having a vinyl display surface adapted to display a design;
   (c) at least one adhesive material permanently disposed on said vinyl display surface; and
   (d) a first pigmented material arranged in a first design pattern and adhered to said display surface by said at least one adhesive material,
      (1) said first pigmented material including a plurality of glass particles operative to reflect light received from a light source.

2. A tire cover according to claim 1 wherein said cylindrical panel and said face panel are formed of vinyl.

3. A tire cover according to claim 1 wherein said cylindrical panel is joined to said face panel by stitching.

4. A tire cover according to claim 1 wherein said at least one adhesive material is a hot-melt adhesive.

5. A tire cover adapted to extend over a tire that includes a tread surface, an annular sidewall surface and a wheel area, comprising:
   (a) a cylindrical panel sized to extend circumferentially around the tire in confronting relation to said tread surface;
   (b) a face panel joined to said cylindrical panel and sized to extend alongside the sidewall surface and across the wheel area;
      (1) said face panel having a display surface;
   (c) at least one adhesive material permanently disposed on said display surface;
   (d) a first pigmented material arranged in a first design pattern and adhered to said display surface by said at least one adhesive material,
      (1) said first pigmented material including a plurality of glass particles operative to reflect light received from a light source; and
   (e) a second pigmented material arranged in a second design pattern and adhered to said display surface by said at least one adhesive material.

6. A tire cover according to claim 5 wherein said second pigmented material includes a plurality of glass particles operative to reflect light received from a light source.

7. A tire cover according to claim 5 wherein said second pigmented material does not include a plurality of glass particles operative to reflect light received from a light source.

8. A tire cover according to claim 5 wherein said first pigmented material is colored a first color and wherein said second pigmented material is colored a second color that is different from said first color.

9. A tire cover according to claim 5 wherein said first pigmented material is adhered to said display surface by a first adhesive material and wherein said second pigmented material is adhered to said display surface by a second adhesive material that is different from said first adhesive material.

10. A tire cover according to claim 5 wherein said first design pattern is contiguous with at least some of said second design pattern.

11. A tire cover according to claim 5 wherein said first design pattern is not contiguous with said second design pattern.

12. A tire cover adapted to extend over a tire that includes a tread surface, an annular sidewall surface and a wheel area, comprising:
   (a) a cylindrical panel sized to extend circumferentially around the tire in confronting relation to said tread surface;
   (b) a face panel joined to said cylindrical panel and sized to extend alongside the sidewall surface and across the wheel area;
      (1) said face panel having a vinyl display surface;
   (c) at least one adhesive material permanently disposed on said vinyl display surface; and
   (d) a first pigmented material arranged in a first design pattern and adhered to said display surface by said at least one adhesive material,
      (1) said first pigmented material including a plurality of retroreflective glass particles operative to reflect light received from a light source.

13. A tire cover adapted to extend over a tire that includes a tread surface, an annular sidewall surface and a wheel area, comprising:
   (a) a cylindrical panel sized to extend circumferentially around the tire in confronting relation to said tread surface;
   (b) a face panel joined to said cylindrical panel and sized to extend alongside the sidewall surface and across the wheel area;
      (1) said face panel having a display surface having a first melt temperature;
   (c) at least one adhesive material permanently disposed on said display surface and having a second melt temperature that is higher than the first melt temperature; and
   (d) a first pigmented material arranged in a first design pattern and adhered to said display surface by said at least one adhesive material,
      (1) said first pigmented material including a plurality of glass particles operative to reflect light received from a light source.

* * * * *